(12) United States Patent
Hughes et al.

(10) Patent No.: US 8,360,149 B2
(45) Date of Patent: Jan. 29, 2013

(54) SURFACE MODIFICATION FOR CROSS-LINKING OR BREAKING INTERACTIONS WITH INJECTED FLUID

(75) Inventors: Trevor Lloyd Hughes, Cambridge (GB); Michael J. Fuller, Houston, TX (US); Jill F. Geddes, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 194 days.

(21) Appl. No.: 12/638,395

(22) Filed: Dec. 15, 2009

(65) Prior Publication Data

US 2010/0147515 A1    Jun. 17, 2010

Related U.S. Application Data

(60) Provisional application No. 61/122,883, filed on Dec. 16, 2008.

(51) Int. Cl.
*E21B 43/22* (2006.01)
*E21B 43/04* (2006.01)
*E21B 43/267* (2006.01)

(52) U.S. Cl. ............ 166/279; 166/278; 166/280.1; 166/300; 166/308.5

(58) Field of Classification Search ............ None
See application file for complete search history.

(56) References Cited

U.S. PATENT DOCUMENTS

| 4,042,031 | A * | 8/1977 | Knapp ............ 166/276 |
| 6,011,075 | A | 1/2000 | Parris et al. |
| 2003/0102128 | A1 * | 6/2003 | Dawson et al. ............ 166/280 |
| 2003/0188872 | A1 | 10/2003 | Nguyen et al. |
| 2005/0173116 | A1 | 8/2005 | Nguyen et al. |
| 2007/0029085 | A1 * | 2/2007 | Panga et al. ............ 166/263 |
| 2007/0039732 | A1 | 2/2007 | Dawson et al. |
| 2007/0254814 | A1 | 11/2007 | Kotlar |
| 2010/0311619 | A1 * | 12/2010 | Mettath et al. ............ 507/120 |

FOREIGN PATENT DOCUMENTS

| CA | 2545563 | 2/2006 |
| WO | 2007033489 | 3/2007 |
| WO | 2007097975 | 8/2007 |
| WO | 2007141519 | 12/2007 |
| WO | 2008004242 | 1/2008 |
| WO | 2008005851 | 1/2008 |

OTHER PUBLICATIONS

SPE 115384—Using Nanoparticle Technology to Control Formation Fines Migration. Huang, T., Crews, J.B., Willingham, J.R. 2008 Society of Petroleum Engineers. Presented at the 2008 SPE Annual Technical Conference and Exhibition held in Denver, Colorado, USA Sep. 21-24, 2008.

* cited by examiner

*Primary Examiner* — Zakiya W Bates
(74) *Attorney, Agent, or Firm* — Jeremy Tillman; Daryl Wright; Robin Nava

(57) ABSTRACT

A method and apparatus for treating a subterranean formation with a fluid, including forming a fluid including a organosilane and a particulate and introducing the fluid into a subterranean formation with exposed surfaces, wherein the organosilane modifies the particulate or surfaces or both. Also, a method and apparatus for treating a subterranean formation with a fluid, including forming a fluid including an organosilane and introducing the fluid into a subterranean formation with exposed surfaces, wherein the organosilane modifies the surfaces with a first functional group.

29 Claims, 2 Drawing Sheets

SURFACE MODIFICATION FOR CROSS-LINKING OR BREAKING INTERACTIONS WITH INJECTED FLUID

PRIORITY CLAIM

This application is related to, and claims the benefit of U.S. Provisional Application 61/122,883, filed Dec. 16, 2008, which is incorporated by reference herein in its entirety.

FIELD OF THE INVENTION

This invention relates to methods and fluids used in treating a subterranean formation. In particular, the invention relates to the preparation and use of proppant, proppant delivery systems, and subterranean formation surface treatment.

BACKGROUND

The statements in this section merely provide background information related to the present disclosure and may not constitute prior art. The oilfield services industry stimulates the productivity of hydrocarbon wells and injector wells in subterranean formations. The most common techniques use aqueous-based fluids to increase hydrocarbon productivity and include matrix acidizing, hydraulic fracturing, acid-fracturing, sand control, water-control, enhanced oil-recovery, and other techniques. A number of these techniques involve the injection of aqueous solutions of polymers that may be crosslinked and may render viscous gels.

In either hydraulic fracturing or water-control, viscosified polymer selection and modification is critical to achieve predictable fluid properties, specifically, fluid rheology, particulate-suspension in hydraulic fracturing, and gel strength in water-control. In these and other stimulation treatments, tailoring the interactions of the gel with either the formation or injected particulates that may comprise part of the treatment could benefit the overall outcome. For example, improved gel strength in water control applications could lead to longer treatment-lifetimes; efficient and predictable generation and subsequent breaking of gel viscosity can help to minimize damage in hydraulic fracturing.

In hydraulic fracturing fluids, a viscosified polymer solution is used to carry solids including proppant such as sand downhole and through the length of the fracture. The inability to carry proppant through the entire fracture length leads to the premature buildup of proppant in the tubulars, the presence of this buildup is referred to as a screenout. The occurrence of a screenout is highly undesirable because of the costs to remove the material. Screenouts most often occur when the viscosity of the fluid is insufficient under the bottomhole temperature, shear rates experienced in the tubulars and fracture, and pressure to carry the proppant throughout the length of the fracture. There is a need to improve the fluid rheology under downhole conditions and, as a result, extend the time for sand-settling to improve the success rate of hydraulic fracturing using crosslinked polymer solutions. A wide variety of polymers are used in the crosslinked-polymer fluids pumped in hydraulic fracturing, including polysaccharides, guar, derivatized guar (including hydroxypropyl guar, HPG, and carboxymethylhydroxypropyl guar, CMHPG), xanthan gum, and diutan. Crosslinking is usually performed by crosslinking the polymer hydroxyl groups using inorganic species such as zirconates, titanates, aluminates, and other species such as borates or protected derivatives of any of these crosslinkers.

The other key to a successful hydraulic fracturing treatment relates to the behaviour of the viscous fluid after proppant placement. The viscous, often crosslinked, carrier fluid carries proppant throughout the fracture. As fluid leakoff occurs through the fracture faces, the crosslinked fluid concentrates significantly in the proppant pack, often leading to significant gel damage in the proppant pack. This gel damage is often strongly adsorbed to the proppant itself and minimizes the expected productivity gains from the fracturing treatment. In order to decrease the fluid rheology after treatment and minimize polymer-gel damage in the proppant pack, "breaker chemicals" are often added either throughout the fracturing fluid or in encapsulated form to release into the fluid upon fracture closure. However, the methods by which these breaker additives are added into the fluid can lead to heterogeneous placement through the proppant pack which often leads to insufficient rheology-break throughout the fracture. For example, encapsulated breaker may be deposited only in selected areas of a proppant pack, not homogeneously. As a result, significant amounts of unbroken polymer gel damage may exist in packets throughout the fracture, specifically, packets of gel strongly adsorbed to the proppant.

Another example of a crosslinked polymer solution used in oilfield services is in water shutoff or water control, where solutions of polymer and crosslinker are injected downhole and, after a delay, form a rigid crosslinked gel under bottomhole conditions including exposure to high temperature and pressure. In water control applications, this rigid, crosslinked gel forms within the formation in the porous matrix. The viscosity of a water control solution should remain low during the injection downhole to minimize friction pressure or drag through the tubular and to ensure injectivity into the target formation. However, the critical parameters for success of a water control treatment are the rigidity or gel strength of the gel upon crosslink and minimized extrusion of the gel from the formation. In current water control formulations, there is a lack of a distinct covalent bond between the crosslinked polymer gel and the formation. This lack can lead to debonding of the gel from the formation and extrusion of the gel out of the porous matrix.

An effective way to treat proppant surfaces and surfaces of subterranean formations to encourage effective interactions with each other and with fluids possibly containing polymer is needed.

SUMMARY

Embodiments relate to compositions and methods for treating a subterranean formation with a fluid, including forming a fluid including a organosilane and a particulate and introducing the fluid into a subterranean formation with exposed surfaces, wherein the organosilane modifies the proppant or surfaces or both. Also, embodiments relate to a method and apparatus for treating a subterranean formation with a fluid, including forming a fluid including an organosilane and introducing the fluid into a subterranean formation with exposed surfaces, wherein the organosilane modifies the surfaces with a first functional group.

DETAILED DESCRIPTION

Figure 1:
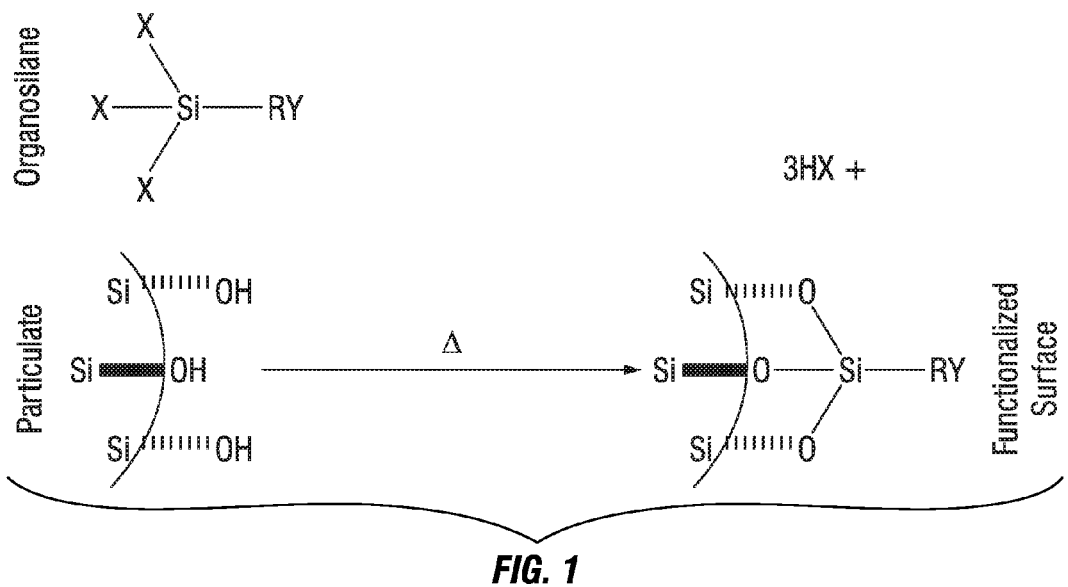
FIG. 1 is a chemical formula of an embodiment.

Some embodiments relate to methods and apparatus to improve the interactions such as crosslinking between chemical components of a well services fluid and coated-solid materials in contact with a well services fluid.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors have disclosed and enabled the entire range and all points within the range.

Most injected particulates used in well treatments have surfaces that are chemically inert and therefore do not participate in any interactions with or crosslinking of the carrier fluid. Additionally, surfaces of the formation rock being fractured are often also chemically inert and do not interact chemically with the fluids being injected downhole. A large family of compounds exists that adds functionality to siliceous material including beyond saturated-alkyl functionality in the form of a covalently-bonded self-assembled monolayer of functional organosilicon compounds such as monomeric organosilanes and oligomeric organosilanes.

An example of a means by which the solid materials discussed above can be functionalized is through the reaction of an organosilane with mono-, di-, or trihalo or with mono-, di-, or trialkoxy functionality with the surface Si—OH groups of the inert solid, as illustrated by FIG. 1, which represents the anhydrous deposition of organosilanes. Alternative mechanisms for organosilanes include hydrolytic deposition, including the reaction of water molecules with an organosilane to form organosilanols, which may self-condense into organosilane oligomers and/or bond with the uncoated surface. Y represents a functional group attached covalently to the siliceous solid through an organic linker R. As such, the functional group Y can interact with the dissolved polymer yielding improved properties of the fluid/solid-substrate combination. Another variable in the organosilane chemistry that can affect the stability of these coatings and the strength of the interactions between the chemical functionality and an aqueous polymer is the length of the organic chain between the terminal functionality and the silicon atom, "R" in FIG. 1. An organic chain may be straight, branched, or partially substituted in mid-chain or may be partially fluorinated. For example, functional organosilanes with longer alkane spacers between the functionality and the silicon atom are generally less prone to hydrolysis and organosilane removal than functional organosilanes with shorter alkane spacers due to the more hydrophobic character imparted by the longer alkane spacer. Functional groups may also be singly or multiply attached along alkyl chain "R."

The properties of aqueous fluids comprising crosslinked and uncrosslinked polymers used for subterranean stimulation or water-shut-off are enhanced by interactions with functionalized surfaces. These surfaces include the surface of injected particulates (for example proppant, sand, fibers, ceramic materials, and colloidal particulates) or the functionalized surface of the subterranean formation itself. The rheology or gel strength of crosslinked-polymer solutions can be enhanced by crosslinking the dissolved polymer directly to a complementary surface-functionalized particulate injected with the fluid. A similar application involves crosslinking between a crosslinked polymeric water-control gel solution and the functionality of a silane used to coat the formation wherein the most populous component of the porous rock (such as quartz in sandstone) leading to an improvement of the resistance of this crosslinked gel to extrusion by crosslinking between the modified-solid and the fluid. Conversely, some chemical functionalities in surface-active agents are possible that can break or otherwise degrade the crosslinks and thus, modify the rheology of injected aqueous polymeric fluids. For example, some surfaces modified with ester groups undergo hydrolysis of the ester to yield a soluble carboxylic acid. Such acids are known to degrade crosslinkers (of polysaccharides, for example), in part due to pH changes upon acid generation. As the acid generation occurs only at the solid surface, minimum polymer-residue strongly binds to the functionalized surface. Interactions between functionalized-solids and viscous or otherwise crosslinked fluids by chemical manipulation of the solid-fluid interface may be tailored for desirable interactions.

The solid substrates described herein that may be chemically functionalized may refer to the formation rock, injected particulates, or both, with the condition that the substrate be siliceous (at least partially comprising silicon-oxygen network) or have a substantial quantity of surface hydroxyl groups such as alumina. This family of substrates is desirable due to the ease by which they are functionalized through reactions with silanes; however, other substrates are capable of similar silane modification, though are carried out less frequently. In hydraulic fracturing, the coated-substrate may comprise one or several of a number of siliceous solids such as proppants such as those used in hydraulic fracturing or sand control, gravels such as those used in gravel packing, colloidal silica, glass/siliceous fibers, other miscellaneous siliceous materials of a wide variety of particle sizes (ranging optimally from 1 micron to 5 mm in diameter) and a variety of particle shapes including spherical, oval, oblong, cylindrical, rod-like, and a number of other regular or high-aspect-ratio shapes, and pluralities of these particulates (such as a mixture of silica/fiber, proppant/silica, or proppant/fiber). Proppant particulates (generally larger particles) optionally with or without addition of fibers are used in hydraulic fracturing to prop open the formation faces of the fracture; colloidal silica particles (generally smaller particles) can optionally be used in aqueous polymer solutions to improve the overall fluid rheology. In water control applications, the coated-substrate will most often refer to the formation itself (coated prior to or simultaneous with the water-control fluid injection) as most water control fluids are squeezed into the porous matrix of the formation itself. In the formation, modified surfaces will include the surface of the porous matrix or medium itself (including quartz, clays, feldspars, and other siliceous minerals) as well as the surface of mobile siliceous particles that may reside in the porous matrix.

Techniques and applications of an embodiment utilize predictable and tailored interactions between aqueous treatment fluids and a solid substrate which may include injected particulates or the formation rock itself, into which the fluid is injected. Specifically, control over these fluid-solid interactions improves subterranean stimulation operations in hydrocarbon wells that use aqueous solutions or dispersions of polymers. Several operations that utilize polymer solutions include hydraulic-fracturing/gravel-packing and water-control/water-shutoff operations. Certain embodiments of each of those operations use the crosslinking of polymers in solution (and often, the breaking of those crosslinks) to achieve certain fluid properties (such as viscosity, gel strength, degradation with shear, viscosity reduction [fluid breaking] and others). Interactions between aqueous polymer solutions and functionalities added covalently to otherwise inert substrates may occur.

In hydraulic fracturing and gravel-packing an aqueous solution of polymer is used to carry particulates downhole. When hydraulic fracturing, those particulates are transported along the length of a fracture after exposure to high-shear environments before inevitably settling inside the fracture and propping open the rock faces. Quite often, the dissolved-polymer must be crosslinked to achieve sufficient viscosity for the fluid to carry the injected particulate such as proppant down the tubulars and subsequently along the length of the fracture while minimizing screen-out. Similar polymers and crosslink strategies are used in water-control and water shut-off fluids, whereby a polymeric solution is injected into a formation matrix and is crosslinked in order to form a rigid gel in the matrix that is resistant to flow into the tubulars through extrusion, particularly in zones of high water-cut.

In both subterranean uses, the polymers that undergo crosslinking include soluble polymers rich in hydroxyl groups including those rich in carboxy groups, for example, polyacrylic acid, including polysaccharides such as guar, hydroxypropyl guar (HPG), and poly(vinyl alcohol) and its copolymers and derivatives, carboxymethylhydroxypropyl guar (CMHPG), carboxymethylhydroxycellulose (CM-HEC), diutan, and partially-hydrolyzed polyacrylamide). Charged polymers or partially charged polymers, including cationic polymers (including chitosan, cationic guar derivatives, cationic polyacrylamide, cationic polyamines and polyammonium derivatives such as poly[3-(methacryloylamino)propyl trimethyl ammonium chloride], poly[vinylbenzyl trimethyl ammonium chloride], and poly[2-(methacryloyloxy)trimethyl ammonium chloride]) or anionic polymers (such as poly(acrylic acid) salts, poly acrylates, or polysulfonates such as poly(styrene sulfonate)) may also be selected for use as a polymer.

Crosslinking of these polymers is achieved through crosslinking the hydroxyl- and/or carboxy-groups of the polymer using inorganic species such as zirconates, titanates, aluminates, and others; borates; or protected derivatives of these crosslinkers or organic crosslinking species such as aldehydes, phenols, and a variety of other organic crosslinkers such as those described in U.S. Pat. No. 6,011,075, which is incorporated by reference herein.

The polymer in a fluid and the functional group on a surface of a proppant or subterranean formation may have an association that is a crosslink or an electrostatic linkage or a charge-charge interaction or highly liabile interaction or some other relationship. The polymer identity and the functional group identity as well as physical and chemical properties of the fluid, subterranean formation, or proppant may all influence the nature of the association between the polymer and the functional group.

A wide variety of functionalities, for example, the Y-groups in FIG. 1, exist in organosilanes that are used to functionalize the substrates. These functionalities may be incorporated on the n-terminal end of alkanes in organosilanes, may be incorporated singly or multiply into branched alkyl organosilanes, or may form, after a controlled delay period, on the n-terminal of an alkane after a degradation or hydrolysis reaction of an organosilane precursor functionality.

Functionalities that could participate in crosslinking may include carboxylates/carboxylic acids (such as N-(trimethoxysilylpropyl)ethylenediamine triacetic acid); carboxylate-forming esters (such as 2-(carbomethoxy)ethyltrimethoxysilane) and anhydrides (such as 3-(triethoxysilyl) propylsuccinic anhydride); amines (such as 3-aminopropyltriethoxysilane, 3-aminopropyltrimethoxysilane, or N-(2-aminoethyl)-3-aminopropyltrimethoxysilane); hydroxylalkanes (such as terminal alcohols like bis(2-hydroxyethyl)-3-aminopropyltriethoxysilane); polyhydroxyl compounds (including cyclic or linear sugars such as glucose or glucose derivatives or derivatives such as N-(3-triethoxysilylpropyl)gluconamide); isocyanates (such as 3-isocyanatopropyltriethoxysilane); masked isocyanates (such as tris(3-trimethoxysilylpropyl)isocyanurate); aldehydes (such as triethoxsilylbutyraldehyde); and a number of others. Additionally, terminal-charged organosilanes may interact through electrostatic attraction with aqueous polymers; these charged moieties include cations such as quaternary ammonium groups (such as N-trimethoxysilylpropyl-N,N,N-trimethylammonium chloride) and anions such as carboxylates (such as carboxyethylsilanetriol), sulfonates, and phosphonates (for example, 3-trihydroxysilylpropylmethylphosphonate). A combination of any of these functionalities may also be selected.

Charged functional groups may also undergo attraction with aqueous charged surfactants including viscoelastic surfactants (VES) that may be included in a fluid introduced into the subterranean formation. Non viscous or viscous solutions of surfactants may also be selected to interact with the functional groups through electrostatic attraction between charged coating and charged surfactant. Charged surfactants may also be selected to be included in the fluid.

Finally, certain organosilane functionalities may degrade such as via ester hydrolysis to generate a reaction byproduct that may disrupt the rheology of the surrounding media (such as acetoxymethyltrimethoxysilane). An example of this is the organic acid that may disrupt polysaccharide crosslinking, possibly through reduction in the surrounding fluid pH that is generated via hydrolysis of the esters in acetoxy-functionalized organosilanes. Conversely, if an ester-functionalized organosilane used to functionalize a substrate undergoes hydrolysis to generate an alcohol (such as 2-(carbomethoxy) ethyltrimethoxysilane), the resulting organosilane coating may have a terminal carboxylate. This form of an ester will then act as a precursor for a charged organosilane (carboxylate), leading to one possible trigger for delayed exposure of anionic-charged coating. Other triggers for charged-coating interactions include varied pH in the surrounding medium.

For example, an aminoalkyl functionalized organosilane (such as 3-aminopropyltriethoxysilane, 3-aminopropyltrimethoxysilane, or n-(2-aminoethyl)-3-aminopropyltrimethoxysilane) may form an ammonium-functionalized organosilane at low-pH values.

Also, coating the substrates with a plurality of organosilanes with several chemical functionalities is possible. For example, in a case when the user did not want the substrate 100% coated with a functionalized-organosilane, one could coat the substrate simultaneously with a second organosilane that is inert to crosslinking interactions. Thus, the concentration of crosslink sites on the treated surface (particulates or formation) can be optimized by varying the composition of the mixed organosilanes used to treat the surface. An example of this method of application is to coat a selected substrate, such as a proppant or sand sample, with a solution of toluene that contains 2% of a mixture comprising 9 parts (90%) octadecyltriethoxysilane and 1 part (10%) N-(3-triethoxysilylpropyl)gluconamide. As the two silanes would have comparable reactivity toward the substrate, the resulting organosilane would be comprised of 10% of the gluconamide organosilane (which could crosslink with polysaccharides or a number of other aqueous polymers) in a 90% octadecyl matrix on the surface (inert to crosslinking with polymer). Examples of the types of functionalized organosilanes that could be co-deposited onto a surface with an inert organosilane (such as a saturated alkyl organosilane) includes charged organosilanes, degradable organosilanes, or reactive organosilanes that could participate in crosslinking or into the main-chain of polyolefins (such as vinyl-functionalized organosilanes).

Suspension of Particulates Injected in Hydraulic Fracturing; Crosslinking between a coated particulate and an aqueous polymer will give rise to improved ability to carry a coated particulate throughout the length of a fracture. This behavior can be achieved through improved bonding (through crosslinking or electrostatic association) between the polymer in the carrier fluid and the chemical-functionality on the particulate coating. Different Y-functional groups on the injected particulate (which may include proppant) can interact with the polymeric fluid to improve several different properties of the polymer/particulate slurry.

Specifically, the embodiments propose improved viscosities of aqueous (crosslinked) polymer solutions using chemical functionalities ("Y" in FIG. 1) that can participate in crosslinking with polymer in the surrounding aqueous medium. The goal of this improved viscosity and enhanced polymer-substrate interaction (that may include crosslinking) is an overall improved ability to carry proppant through the length of hydraulic fractures toward reducing screenout events. This may allow for efficient particulate suspension in fluids of lower-viscosity than that of most crosslinked polymer solutions. Most crosslinked polymeric fracturing fluids include crosslinking of the hydroxyl groups or carboxylate groups of polysaccharides such as guar, HPG, and poly(vinyl alcohol), CMHPG, CMHEC, diutan, and chitosan; these crosslinked solutions largely bear high-viscosities for enhanced proppant suspension through the high-temperatures, high pressures, high shear rates experienced down the tubulars, and subsequent low shear rates experienced during transport along the length of the fracture. Proppant suspension (in viscous or lower-viscosity crosslinked polymer fluids) is enhanced if the proppant is functionalized with a persistent organosilane monolayer that participates in this crosslinking (including organosilanes with functionalities such as hydroxyl, carboxylate, and carboxylic acid or organosilanes that slowly generate these functionalities), leading to a covalent bond between aqueous polymer and surface functionality. One of the primary benefits to covalent crosslinking of the proppant (coating) to the polymer in the surrounding medium is that proppant-suspension could possibly be carried out at lower-polymer loadings, leading to lower proppant-pack damage and lower cost of the additives for execution. However, some fracturing fluids include lower-viscosity solutions of polymers such as polyacrylamide and poly(acrylic acid) derivatives (as opposed to the solutions of polysaccharides discussed above); these polymers are known to undergo crosslinking via either metallic crosslinkers (such as chromium cations) or organic crosslinkers (such as phenol/formaldehyde crosslinking); if a solution of one of these polymers were allowed to crosslink to an organosilane functionalized proppant (with functional groups such as carboxylate, hydroxyl, or aldehyde), the functionalized proppant could be carried easier in the low-viscosity fluid than an unfunctionalized proppant.

Hydraulic Fracturing and Improved Proppant-Flowback Control: One of the secondary challenges in hydraulic fracturing is that of minimizing proppant flowback (to the surface facilities) after the fracture has been placed and the fracture faces close on the proppant pack; proppant flowback to the surface after a fracture can deteriorate surface equipment and can be very costly to the producer as a result. Several ways currently used (commercially) for flowback control include a) uses of resin-coated proppant (often tailed into the end of the proppant during execution), leading to a porous cured-resin pack close to the wellbore and b) uses of fibers (such as Schlumberger's PROPNET™ product), tailed in at the end of a fracturing treatment. However, these techniques suffer from several disadvantages: resin-coated proppants often suffer from incompatibilities with select fracturing fluids; methods using fibers such as PROPNET™ require specialty equipment at the wellsite to accurately meter in the required amount of fibers, adding complexity at the wellsite.

Figure 2A:
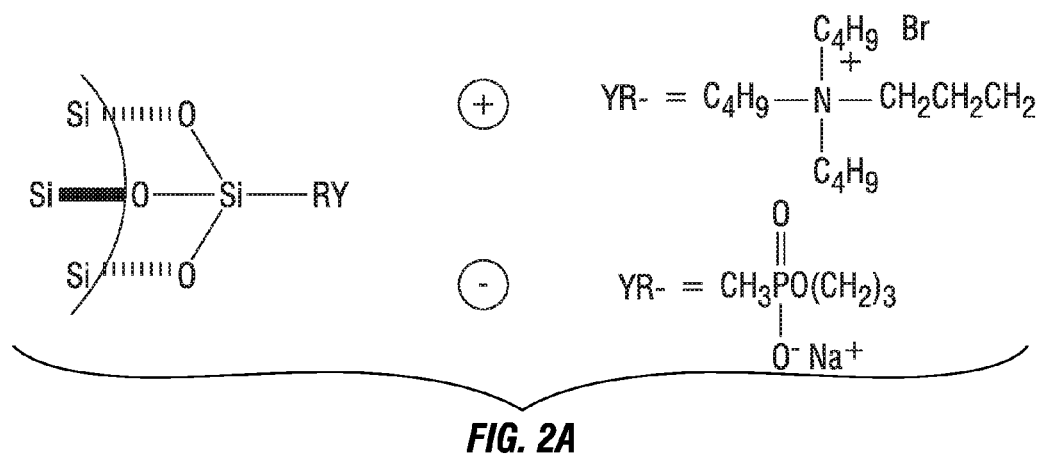
FIG. 2 is a diagram of chemical properties of an embodiment.
Figure 2B:
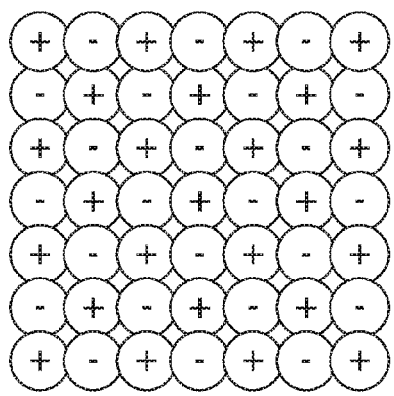

Two ways to minimize proppant flowback by utilizing functionalized organosilanes exist. The first method (illustrated in FIG. 2) injects a plurality of oppositely charged-functionalized proppant particles that exhibit strong interparticle attractive forces (via electrostatic attraction) to minimize proppant flowback. Throughout a treatment or tailed-in at the very end of the treatment (preceded by unfunctionalized or uncharged-functionalized proppant) this first method involves simultaneous injection of cationically-charged (such as stable quaternary ammonium) organosilane-coated proppant with anionically-charged (such as carboxylate, sulfonate, or phosphonate) organosilane-coated proppant. The cationically and anionically-charged proppants are distributed homogeneously through the proppant pack in the fracture (as illustrated in FIG. 2(b)) and adjacent anionic-coated particles and cationic-coated particles exhibit strong interparticle bonding, thereby minimizing the tendency of proppants to exit the proppant pack and flowback to the surface. This same mechanism also provides stabilization of mobile fines where those fines are charged-clay particles with opposite charge to a charged-organosilane-coated particulate pack; similar fines stabilization has been shown using nanoparticle-coated proppant packs to stabilize fines migration through the coated-pack.

Figure 2C:
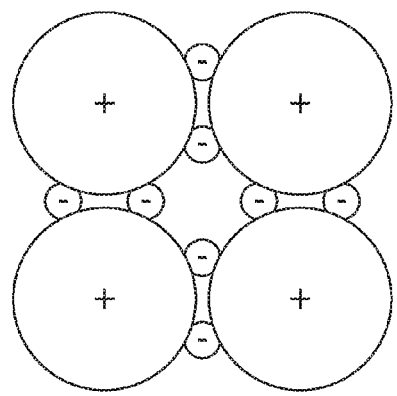

Another means of triggering charged-coating interactions is varying pH in the surrounding medium with a previously uncharged organosilane-coated particulate. For example, an aminoalkyl functionalized organosilane may form an ammonium-functionalized organosilane at low-pH values. In an embodiment, the plurality of particles could also include differentially-sized particles (such as those available using the CRETE™ technology which is commercially available from Schlumberger Technology Corporation of Sugar Land, Tex.) with simultaneous injection of smaller particles to fill the space of packed larger particles; in this case, one or both of these (sizes) of particles may be coated with an organosilane, and the silanes on different particulates may bear different chemical functionality. Further, the two sized particles may be charged oppositely, such as anionically charged small particles stabilizing a proppant pack made up of cationically-charged larger proppant; this concept is illustrated in FIG. 2(c).

The second method requires an injection of coated-particulates (either throughout or at the end of a fracturing treatment) that are crosslinked into a porous, crosslinked structure through organic crosslinks. Functionalities on organosilane coatings (coated on proppant) appropriate for embodiments include those that can crosslink to polyacrylamide. These functionalities include organosilanes with functionalities such as hydroxyl, carboxylate, carboxylic acid, amine, and aldehyde. Crosslinkers include, for example, phenol/formaldehyde systems or hexamethylenetetramine/phenyl acetate systems. One way to form this stabilized pack and to minimize proppant flowback is to tail in the functionalized-organosilane-coated proppants (described above) and after placement of the fracture, injection/post-flush of an aqueous solution of (optionally partially-hydrolyzed) polyacrylamide and optionally an inorganic or organic crosslinker. This final step could optionally be followed by a shut-in under downhole conditions.

Hydraulic Fracturing: Aqueous fluids comprising crosslinked-polysaccharides are widely used in hydraulic fracturing. However, during fracture placement and closure, the polymer will concentrate in the proppant-pack (due to fluid leakoff into the formation) which can lead to significant damage to the pack permeability (and conductivity). Often, oxidative breakers and enzymatic breakers are added (in live-form or encapsulated-form) to fracturing fluids to break down the fluid rheology via breakdown of the crosslinked polymer structure. However, live breakers often prematurely break the fluid (leading to screenout) and encapsulated breakers often cluster in the proppant pack, leading to inhomogeneous pack cleanup. Further, polymer damage to the proppant pack can strongly adhere to the proppant particles, leading to resilient damage over long periods of time.

Figure 3:
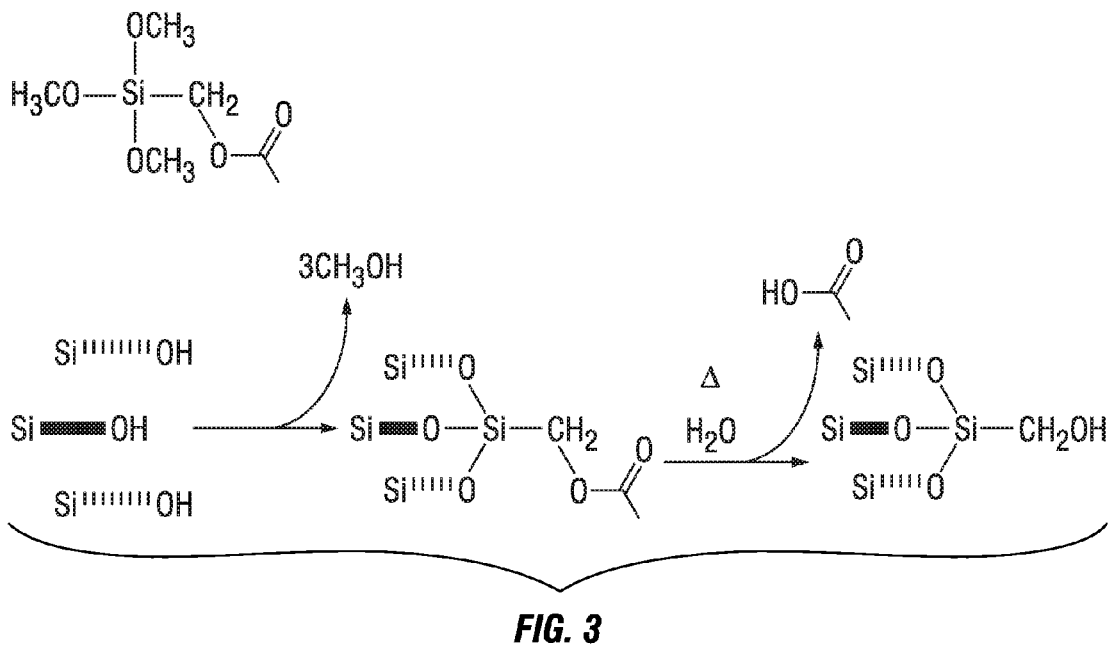
FIG. 3 is a chemical formula of an embodiment.

Hydraulic fracturing systems may use a crosslinked-polymer fluid to carry organosilane-coated proppant particles whose organic functionality degrades to form a chemical capable of breaking the fluid rheology. Embodiments use organosilanes that undergo degradation to form organic acids, such as linear alkanes with terminal acetoxy groups (esters) or anhydrides whose hydrolysis/degradation will form acids (such as acetic acid). Examples of these degradable surface-active organosilanes include acetoxymethyltrimethoxysilane, acetoxymethyltriethoxysilane, and acetoxypropyltrimethoxysilane. In the case of acid-generating organosilane-coated proppant, the proppant or injected particulate is coated with organosilane on the surface; the coated proppant is injected downhole; and finally, the acid-generating hydrolysis reaction occurs after exposure to downhole conditions such as heat and pressure. In the cases of acetoxyorganosilane coatings, the acetic acid will form a localized reduction in pH which will degrade or disrupt the crosslinked polysaccharide structure throughout the proppant pack. Further, as the acetic acid will form from an organosilane monolayer on the proppant surface, the acid will be localized on the proppant surface and as a result, the polymer-damage will be easily removed/cleaned from the proppant surface (and will lead to more rapid fluid cleanup) and/or the crosslinking may be disrupted. The formation of acetic acid from the hydrolysis of organosilane of an acetoxymethylsilane-coated substrate is illustrated in FIG. 3. The initial step illustrated in FIG. 3 shows the coating of a previously uncoated silica substrate with acetoxymethyltrimethoxysilane, followed by the hydrolysis that would likely occur under bottomhole conditions. This mechanism for forming acid-breaker for the crosslinker polysaccharide may optionally be used along with conventional breaker additives.

Water-Control: The polymers used in water control gels often include poly(acrylic acid) derivatives or polyacrylamide derivatives (such as partially-hydrolyzed polyacrylamide) and the gel strength is given by crosslinking using metallic crosslinkers (such as chromium derivatives) or organic crosslinkers (including phenol/formaldehyde or hexamethylenetetramine/phenyl acetate systems). The success of water-control treatments is often given in the resistance of the crosslinked polymer to extrusion through the formation porosity. This gel extrusion can be attributed to the lack of a strong bond between the gel and the formation-rock. Embodiments use extension of the lifetime of water-control treatment through bonding (specifically, crosslinking) of the gel to the formation-rock; crosslinking between the water-control gel and an organosilane functionalized with groups that can participate in crosslinking lead to enhanced resistance to extrusion. Organosilanes may include functionalities such as hydroxyl, carboxylate, carboxylic acid, amine, and aldehyde, all of which are known to participate in the crosslinking of polymeric gels such as those currently used in commercial water control gels.

While some aspects have been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

We claim:

1. A method for treating a subterranean formation with a fluid, comprising:
   forming a fluid comprising an organosilane and a particulate selected from the group consisting of proppant, fiber, gravel, colloidal silica, siliceous materials, and a combination thereof; and
   introducing the fluid into a subterranean formation with exposed surfaces,
   wherein the organosilane modifies the particulate or the exposed surfaces or both, and
   wherein the modified particulate or the modified exposed surfaces or both undergoes degradation that forms a modified functional group of varied chemical identity.

2. The method of claim 1, wherein the particulate is a proppant.

3. The method of claim 1, wherein the particulate is coated by the organosilane.

4. The method of claim 1, wherein the particulate has an organosilane coating.

5. The method of claim 1, wherein the fluid comprises an aqueous polymer.

6. The method of claim 5, wherein the aqueous polymer comprises polyacrylic acid, guar, hydroxypropyl guar (HPG), poly(vinyl alcohol), carboxymethylhydroxypropyl guar (CMHPG), carboxymethylhydroxycellulose (CMHEC), diutan, partially-hydrolyzed polyacrylamide, charged polymers, partially charged polymers, cationic polymers, copolymers and derivatives thereof, and combinations thereof.

7. The method of claim 1, wherein the fluid comprises a crosslinker.

8. The method of claim 7, wherein the crosslinker is zirconate, titanate, aluminate, borate, aldehydes, phenols, or derivatives thereof and/or combinations thereof.

9. The method of claim 7, wherein the crosslinker promotes association between the organosilane and an aqueous polymer.

10. The method of claim 1, wherein the functional group degradation is a hydrolysis reaction.

11. The method of claim 1, wherein the functional group degradation produces a byproduct.

12. The method of claim 11, wherein the byproduct modifies a surrounding pH.

13. The method of claim 11, wherein the byproduct disrupts crosslinking.

14. The method of claim 1, wherein the organosilane bears a functional group that comprises carboxylic acids, carboxylate-forming esters, anhydrides, amines, hydroxylalkanes, polyhydroxyl compounds, isocyanates, masked isocyanates, aldehydes, quaternary ammonium groups, carboxylates, sulfonates, or phosphonates or a combination thereof.

15. The method of claim 1, wherein the organosilane is as N-(trimethoxysilylpropyl)ethylenediamine triacetic acid, 2-(carbomethoxy)ethyltrimethoxysilane, 3-(triethoxysilyl) propylsuccinic anhydride, 3-aminopropyltriethoxysilane, 3-aminopropyltrimethoxysilane, N-(2-aminoethyl)-3-aminopropyltrimethoxysilane, terminal alcohols, cyclic or linear sugars, 3-isocyanatopropyltriethoxysilane, tris(3-trimethoxysilylpropyl)isocyanurate, triethoxsilylbutyraldehyde, N-trimethoxysilylpropyl-N,N,N-trimethylammonium chloride, carboxyethylsilanetriol, 3-trihydroxysilylpropylmethylphosphonate or a combination thereof.

16. The method of claim 1, further comprising introducing a second organosilane that is inert to crosslinking interactions.

17. The method of claim 1, wherein the particulate has a shape that is characterized as spherical, oval, oblong, cylindrical, rod-like, or high-aspect-ratio or a combination thereof.

18. The method of claim 1, further comprising gravel packing, hydraulic fracturing, or acid fracturing.

19. A method for treating a subterranean formation with a fluid, comprising:
forming a fluid comprising an organosilane and a particulate selected from the group consisting of proppant, fiber, gravel, colloidal silica, siliceous materials, and a combination thereof; and
introducing the fluid into a subterranean formation with exposed surfaces,
wherein the organosilane modifies the exposed surfaces with a first functional group, and
wherein the first functional group undergoes degradation that forms a modified functional group.

20. The method of claim 19, wherein the modified functional group is imparted by the organic group of the organosilane.

21. The method of claim 19, further comprising a crosslinker.

22. The method of claim 21, wherein the crosslinker promotes association between the modified functional group and an aqueous polymer.

23. The method of claim 22, wherein the association decreases gel extrusion from the formation.

24. The method of claim 22, wherein the modified functional group has a stronger interaction with the aqueous polymer than the first functional group.

25. The method of claim 24, wherein the stronger interaction is crosslinking.

26. The method of claim 21, wherein the degradation of the first functional group is a hydrolysis reaction.

27. The method of claim 21, wherein the degradation of the first functional group produces a byproduct.

28. The method of claim 27, wherein the byproduct modifies the surrounding pH.

29. The method of claim 27, wherein the byproduct disrupts crosslinking.

* * * * *